United States Patent [19]
Sturgeon et al.

[11] 3,861,064
[45] Jan. 21, 1975

[54] APPARATUS SUPPORTING A STATIONARY AUTOMOBILE, FOR DRIVER TRAINING

[76] Inventors: James L. Sturgeon, 4544 Via de la Plaza, Yorba Linda, Calif. 92686;
Ronald K. Ford, 2438 E. Monroe Ave., Orange, Calif. 92667

[22] Filed: Mar. 12, 1973

[21] Appl. No.: 340,092

[52] U.S. Cl. .................................................... 35/11
[51] Int. Cl. ............................................ G09b 9/04
[58] Field of Search .......................................... 35/11

[56] References Cited
UNITED STATES PATENTS

| | | | |
|---|---|---|---|
| 2,627,674 | 2/1953 | Wilson | 35/11 |
| 2,672,696 | 3/1954 | Wentz | 35/11 |
| 3,107,437 | 10/1963 | Larlham et al. | 35/11 |
| 3,686,776 | 8/1972 | Dahl | 35/11 |

FOREIGN PATENTS OR APPLICATIONS

| 782,214 | 4/1968 | Canada | 35/11 |
|---|---|---|---|

Primary Examiner—John H. Wolff
Attorney, Agent, or Firm—Fulwider, Patton, Rieber, Lee & Utecht

[57] ABSTRACT

Apparatus which supports an automobile so that its wheels may be rotated and steered with the automobile remaining stationary, thereby facilitating the very first stages of driver instruction. The apparatus includes a platform resting on the ground in underlying relation to the automobile, in general alignment with it. A pair of front rollers underlies the front wheels of the automobile, each roller supporting one of the automobile front wheels. The rollers are rotatably connected with the platform and permit side-to-side steering movements of the front wheels while the front wheels are rotating.

7 Claims, 3 Drawing Figures

PATENTED JAN 21 1975

3,861,064

APPARATUS SUPPORTING A STATIONARY AUTOMOBILE, FOR DRIVER TRAINING

BACKGROUND OF THE INVENTION

This invention relates to an aid for driver training enabling the initial stages of instruction to be performed in an automobile in which the automobile front wheels are rotating and may be steered while the automobile remains in a stationary condition.

In teaching beginners to drive, particularly children or persons of a timid disposition, there can be problems in conducting the earliest stages of driving instruction in a moving vehicle. Under such conditions the pupil may be so nervous of the risk of collision that his learning ability is impaired and, in addition, he may fail to develop the confidence necessary to become a proficient driver sufficiently rapidly. The alternative to performing instruction in a moving vehicle is to teach the pupil in a parked vehicle with the engine running. However, simulated steering in a parked vehicle is most unrealistic because of the high degree of effort necessary to steer the wheels when they are stationary and because there is no feedback relation between motor operation and steering movement. Thus, the pupil does not gain the feeling of control necessary to build the confidence necessary to proceed to the next stage of instruction on a moving vehicle. Further, he does not begin to learn any coordination between steering movements of the wheels and operation of the automobile motor.

Recognition of these problems and a solution to them utilizing a stationary vehicle mounted on rollers which permit the vehicle wheels to turn while the vehicle remains in a stationary condition, is described in an application being filed concurrently herewith by one of the Applicants herein, JAMES L. STURGEON, entitled, METHOD AND MEANS FOR TRAINING DRIVERS TO OPERATE AUTOMOBILES, and given Ser. No. 340,091. That application discloses a tethered automobile mounted on a stationary platform with the front and rear wheels of the automobile resting upon front and rear pairs of rollers which enable the wheels to rotate without movement of the automobile along the ground. Driving motion of the rear wheels of the automobile is transferred to its front wheels by providing a drive chain between the rear rollers and the front rollers. Adjustable tether units connect the front and rear ends of the automobile to the platform to selectively adjust the frictional engagement between the wheels and the rollers on which they rest.

Although highly satisfactory in operation, attention may be drawn to certain apparatus aspects of the vehicle platform just described which the present invention is intended to improve. Thus, the use of adjustable tether units requires an appreciable time of adjustment each time the automobile is moved onto the platform, in order to obtain the desired degree of frictional engagement between the automobile wheels and the rollers, before the vehicle is ready for instruction to commence. A further aspect is that the use of double pairs of rollers at the front and rear to support the automobile wheels does significantly affect the overall cost and weight of the unit.

SUMMARY OF THE INVENTION

The present invention provides an apparatus for supporting an automobile so that its wheels may be rotated and steered with the motor running while the automobile remains in a stationary condition. The stationary condition of the automobile removes fear of collision as a factor from the mind of a beginner driver undergoing his first stages of instruction and is particularly significant in the instruction of a child or a timid person having his first exposure to the control of substantial moving machinery.

A significant aspect of the apparatus of the present invention is that the automobile may be driven onto the apparatus and coupled to it without any lengthy period of adjustment necessary to obtain the desired degree of driving friction between the automobile wheels and the underlying rollers on which they rest. This desirable result is achieved by providing a locating mechanism at the front end of the platform which cooperates with an engagement fixture secured to the underside of the automobile to position the front wheels in a predetermined positional relation to the underlying front rollers. In the predetermined position, the locating mechanism and the front rollers share the weight of the front end of the automobile in predetermined ratio which insures the correct degree of frictional engagement between the front rollers and the front wheels.

Positioning of the rear wheels of the automobile to obtain the correct frictional engagement with the rear rollers is obtained utilizing a pivoted link mechanism movable through an over-center range of travel between initial and final positions. As the automobile is driven onto the platform, a rear engagement member fixedly secured to the automobile engages the upper end of the link mechanism and during continued motion, the link is carried forward to its final position. In the final position of the link, the weight of the rear end of the automobile is shared in a predetermined ratio between the link mechanism and the rear rollers, thereby insuring the correct degree of frictional engagement between the rear wheels and the rear rollers.

The apparatus of the present invention is of simplified construction in that it has been found that single pairs of rollers alone at the front and rear ends of the automobile are sufficient to support the automobile when its positional relationship is determined by the locating mechanism previously described. The use of single pairs of rollers effects a considerable overall saving in material and labor and reduces the weight of the apparatus by a substantial amount.

When the automobile used for instruction is a rear wheel drive automobile, the rotational motion of the front wheels is obtained by a transfer of driving motion from the rear wheels to the front wheels. For this purpose the rear wheels are mounted on rear rollers rotatably connected with the platform and the rotational motion of the rear rollers is transferred by a drive train to the front rollers which in turn rotate the front wheels. As the pupil steers the front wheels of the automobile from side to side so that they become skewed on the front rollers the frictional loading on the front rollers is varied and the resulting change in torque is transmitted back through the drive train to the engine which slows down or accelerates accordingly, giving an effect analogous to that which occurs when the front wheels of a vehicle are steered from side to side in motion on the road. The pupil can thus be instructed to alter his use of the automobile accelerator to vary the driving force delivered to the wheels during the side-to-side steering motion. As a result he is able to acquire a degree of coordination between accelerator and steering movements before he is ever exposed to instruction on a moving vehicle. Also, of course, the pupil learns the technique of shifting gears while the motor is running.

BRIEF DESCRIPTION OF THE DRAWINGS

An apparatus for supporting a stationary automobile, constructed in accordance with the invention, is illustrated in the accompanying drawings in which.

DETAILED DESCRIPTION

Figure 1:
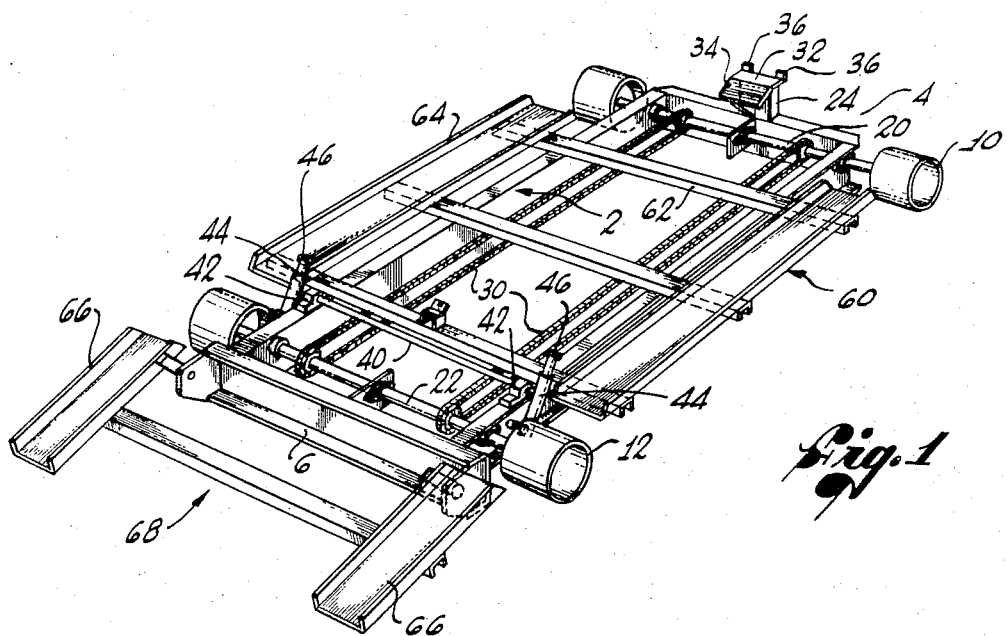
FIG. 1 is a perspective view of an apparatus for supporting an automobile constructed in accordance with the preferred embodiment of the invention.
Figure 2:
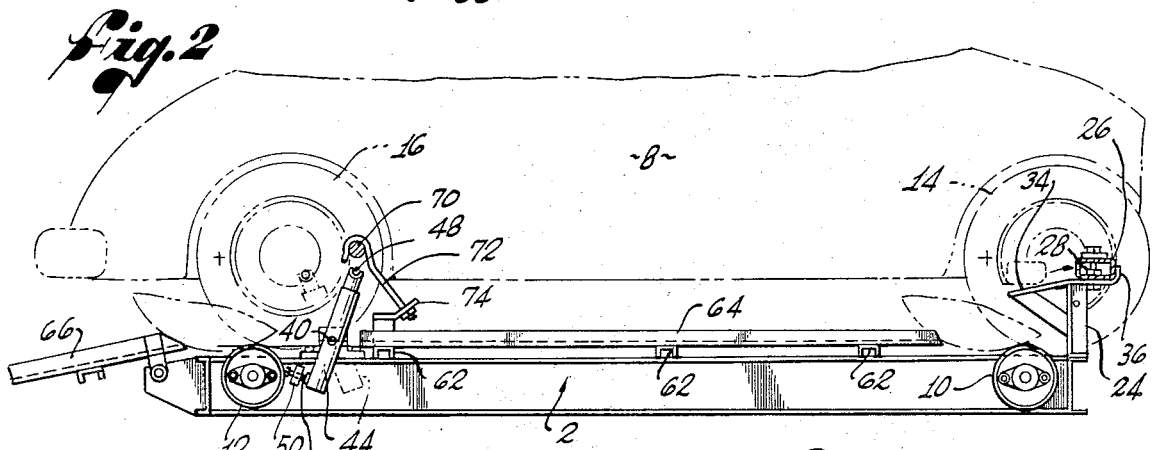
FIG. 2 is a side view of the apparatus shown in FIG. 1 with portions of an automobile shown in tethered position on the apparatus.

Referring to FIGS. 1 and 2 of the drawings, an apparatus for supporting a stationary automobile, constructed in accordance with the preferred embodiment of the invention, is there shown. The apparatus includes a generally rectangular ground supported frame 2 having front and rear ends 4 and 6, respectively. An automobile 8 is supported on and above the platform 2 by single pairs of front and rear rollers 10 and 12, respectively, on which the automobile front and rear wheels, identified as 14 and 16, respectively, rest. The rollers 10 and 12 are supported by horizontal front and rear transverse axles 20 and 22, respectively, journalled in the platform 2. The automobile 8 is positionally located in predetermined relation to the rollers 10 and 12 by a forward, locating mechanism which includes a pillar 24 connected to the front end of the frame. The pillar is engaged by a front engagement member 26 fixedly and permanently secured to the underside of the automobile 8 adjacent the front bumper region. In the engaged position, the engagement member 26 is secured to the pillar by a connector 28.

In the engaged position of the automobile on the underlying platform 2, the wheels may be driven by the engine causing rotation of the front wheels (as will be described) and the front wheels may be steered from side to side, while the automobile remains stationary on the platform. A beginning driver, particularly one who is a child or timid person not used to controlling large, moving machinery, can gain his first experience of control in the tethered automobile free of any fear of collision.

Rotational movement of the automobile front wheels is achieved directly by the automobile motor when a front wheel drive automobile is used. In the case of a rear wheel drive vehicle, it is necessary to transfer the rotational movement of the rear wheels to the front wheels because it is only when the front wheels are turning that the pupil will be able to turn them with a degree of ease approximating that encountered during road driving conditions. For this purpose, two drive chains 30 are provided extending around fixed sprockets secured to the axles 20 and 22.

As the front wheels are steered from side to side so that they become skewed on the front rollers 10, the degree of frictional engagement between the wheels is changed relative to the frictional engagement when the wheels are in the straight ahead position and the change is transmitted back through the drive chain and the rear axle rear rollers to the motor. Thus, the load on the automobile motor is varied as the front wheels are steered in a manner analogous to that in which the load on the motor is varied during steering motion on the road. The pupil can thus be instructed to conduct coordinated operation of the vehicle motor with the steering movements, to learn some of the driving skills before proceeding to the next phase of instruction on a moving vehicle. Moreover, during the period he is acquiring this degree of control, the pupil learns to shift gears and otherwise acquires familiarity with the vehicle and tends to lose his awe so that problems of lack of confidence which may have been present initially disappear before his first attempt to control a moving vehicle.

To achieve the desired driving relation between the wheels of the automobile and the rollers on which they rest, it is necessary to position the automobile precisely in relation to the rollers. Considering the forward locating mechanism in more detail, the previously mentioned pillar 24 is an upright, angle-section column secured to the front transverse end of the platform 2, having a flat horizontal plate 32 fixed to its upper end. The engagement member 26 permanently carried by the automobile is a box section, horizontal girder fixedly secured to the automobile adjacent and generally centrally of its front axle. The engagement member 26 rests with its lower surface on the upper surface of the plate 32. When the automobile is driven onto the apparatus, the engagement member 26 moves into contact with an inclined guide plate 34 bent downwardly and rearwardly from the top plate 32. During continued forward motion of the automobile, the guide plate guides the engagement member for sliding motion onto the plate 32. Continued forward movement of the engagement member 26 is limited when it strikes two upwardly projecting stops 36 at the edge of the plate 32 at which time the engagement member is located in a predetermined final position in relation to the platform.

In the final position, the weight of the front end of the automobile is shared between the pillar 24 and the front rollers 10 on which the front wheel 14 is resting. The ratio in which the automobile weight is divided and hence the particular value of the force imposed on the rollers 10 can be predetermined by selecting the pillar 24 to be of a predetermined height. Once the vertical dimension of the column 24 has been determined, then, each time the automobile is mounted on the platform, the underlying rollers 10 will take their predetermined share of the front end of the automobile weight and be preloaded thereby to provide the desired degree of frictional engagement between the front rollers and the front wheels. Thus, the need for precise adjustment each time the automobile is mounted on the platform is eliminated by the locating mechanism comprising the pillar 24 and the engagement member 26 so far as the front rollers 10 are concerned.

The need for precise adjustment on the rear rollers 12 each time the car is mounted on the platform, is also eliminated, but by a rear locating mechanism involving pivoted links. The rear locating mechanism includes a transverse shaft 40 spaced forwardly of the rear rollers 12 and mounted on the platform 2 by bearings 42. Secured to the extremities of the shaft 40 are two vertically inclined coextensive links 44 each of which has a cup-shaped fitting 46 at its upper end. Prior to movement of the automobile onto the platform, the links 44 are pivoted to a rearwardly inclined position facing towards the oncoming automobile. The front of the automobile passes over them and continues on until it reaches the previously mentioned pillar 24. Adjacent the rear axle of the automobile, there are fixedly mounted two rear engagement members 48 which impinge upon and are received within the cup-shaped fittings 46 at the upper ends of the links 44. As the forward motion of the automobile continues, the links 44 are pivoted forwardly in a path of over-center travel to a final inclined position shown in FIG. 2 in which the rear engagement members are in a predetermined final position in relation to the platform. Further forward pivoting movement of each link 44 is prevented by impingement upon a step 50 fixedly secured to the platform 2 and positioned in the path of the lower end of the link below the shaft 40.

In the final position of the links 44, the weight of the rear end of the vehicle is shared between the links and the rear rollers. By suitable choice of the length of the links, the force carried by the rollers and, hence the frictional engagement between the rollers and the wheels, can be arranged at a predetermined value. Thus, the rear locating mechanism also provides an automatic adjustment of the rear wheel friction to the correct value when the vehicle is driven into position on the platform.

In a further refinement, the previously mentioned limit stop 50 may include an adjustment screw 52 for precise adjustment of the final position of the link.

The previously described movement of the vehicle onto the platform requires the provision of wheel tracks on which the wheels may ride to their final position. On the platform 2 there is provided an upper platform 60. The upper platform includes three transverse girders 62 which support two upwardly facing, angle section tracks 64 extending between and spaced from the rollers 10 and 12 on a level with the upper surfaces of the rollers. Aligned with the tracks 64 and spaced to the rear of the rear rollers 12 are two inclined tracks 66 of similar configuration inclined upwardly and forming part of an inclined ramp 68 secured to the rear end of the platform 2. It will be appreciated that the vehicle is driven forwardly up the ramp 68 so that the front wheels 14 pass up the track 66, over the rear rollers 12 into the tracks 64 and eventually onto the rollers 10. In the final position, in which the front engagement member 26 has come into abutting contact with the limits 36, the front and rear wheels 14 and 16 rest in a forwardly off center position on the forward and rear rollers 10 and 12 as shown in FIG. 2.

To maintain the precise alignment that is obtained when the vehicle is driven onto the platform during the period of subsequent driver instruction, the previously mentioned forward connector 28 is inserted vertically through the front engagement member 26 and the platform 32 secured to the pillar. The connector 28 may be a bolt and nut. To provide a positive connection adjacent the rear of the vehicle, a horizontal tiebar 70 (FIG. 2) is fixedly and permanently secured to the underside of the vehicle adjacent and forward of the rear wheels. A curved hook 72 is looped over the tiebar 70 and has a threaded free end which is connected to a bracket 74 fixedly mounted on an adjacent one of the previously mentioned girders 62 by a bolt.

Figure 3:
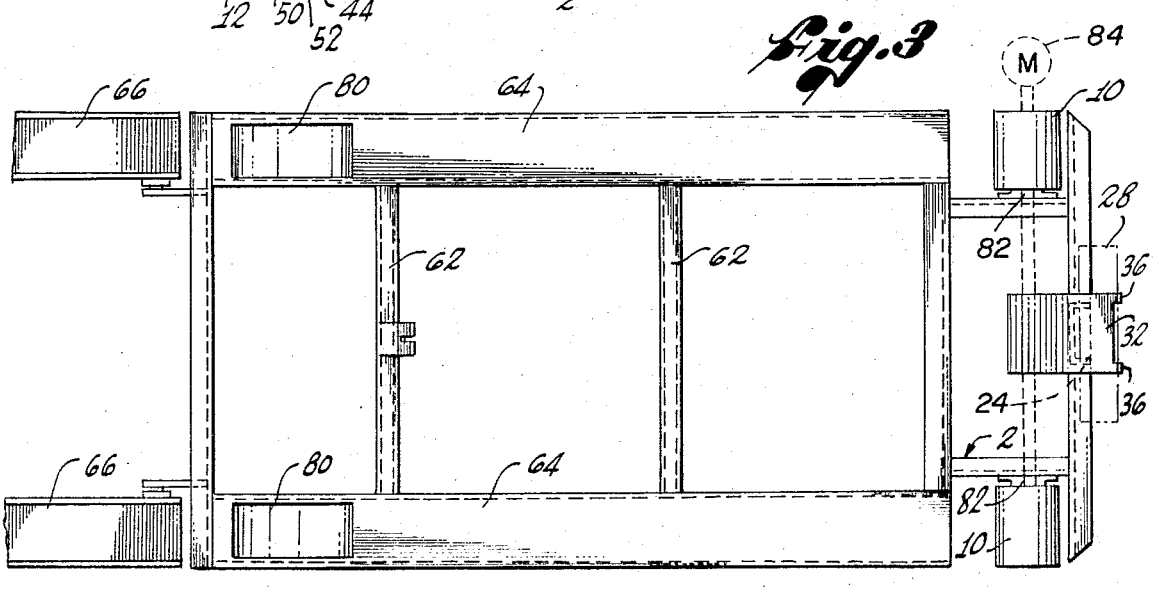
FIG. 3 is a top view of an alternative embodiment of the apparatus according to the invention.

It is also possible to conduct driver instruction using a front wheel drive automobile and under such circumstances, an alternative embodiment of the apparatus illustrated in FIG. 3 is used. The alternative embodiment is similar in its construction to the foregoing preferred embodiment except in the following characteristics to be described.

In place of rollers for supporting the rear wheels 16 of the automobile, the rear wheels rest in stationary relation upon shallow wheel wells 80 formed in the tracks 64 which are extended rearwardly into the region beneath the rear wheels. At the same time, the drive chains and drive sprockets are eliminated because the drive is directly from the front wheels of the automobile to the front rollers 10. As there is no need to drive the front wheels by a driveshaft, the single front transverse axle can be eliminated and the front rollers are separately mounted on individual stub shafts 82 secured to and extending sidewardly from the platform.

Although the front rollers have thus far been described as being driven by the automobile motor, it may be desirable under certain circumstances to operate the system with the automobile shut off and a non-polluting motor, such as an electric motor 84, drivingly coupled to the front rollers 10. This may be desirable, for example, when conducting driving instruction within a building such as an aircraft hanger or the like where buildup of fumes is to be avoided.

Although the invention has been described with reference to certain preferred embodiments, it will be understood by those skilled in the art that many deletions, additions, substitutions, modifications, and other changes may be made which will fall within the spirit of the invention.

We claim:

1. Driver instruction apparatus for supporting a stationary automobile with a pair of steerable front wheels and a pair of rear wheels at least one of the pairs of wheels being driven wheels, said apparatus comprising:

a platform adapted to rest on the ground and having front and rear ends and ramp means for raising the automobile onto said platform in general alignment and overlying relation therewith;

a single pair of front rollers, each of said front rollers adapted to underlie and engage one of the front wheels of the automobile, thereby to support in part the weight of the automobile, driving motion of the pair of driven wheels of the automobile being transferred to said front rollers;

means connected with said platform for supporting said front rollers for rotation in response to rotation of the driven wheels of the automobile about an axis generally parallel with the axes of rotation of the automobile wheels;

an engagement member fixedly secured to the automobile at the front end thereof;

locating means connected with said platform and releasably engageable with said engagement means, said locating means including;

a supporting surface rigidly mounted on the front end of said platform to underlie and support said engagement member in an installed position of the automobile, and thereby to support a predetermined proportion of the weight of the automobile normally supported by the front wheels;

a guide surface extending rearwardly and downwardly from said supporting surface, said guide surface cooperating with said engagement member and guiding it onto said supporting surface during forward movement of the automobile to said installed position, and stop means connected with said supporting surface for terminating forward movement of said engagement member as said installed position is reached; and releasable connector means for connecting said locating means with said engagement member to prevent movement of the automobile from said installed position on said platform;

whereby the front wheels of the automobile in said installed position are steerable from side to side, and a simulation of real driving conditions is obtained as the front wheels, carrying only a preselected proportion of their normal load, frictionally engage said driven front rollers to an extent dependent on the steering position of the wheels.

2. An apparatus as defined in claim 1 adapted for operation with driven front wheels of the automobile when the automobile supported is of front wheel drive construction wherein said front rollers are rotated directly by positional engagement with the driven front wheels of the automobile.

3. An apparatus as defined in claim 1, adapted for operation with driven rear wheels of the automobile when the automobile supported is of the rear wheel drive type, said apparatus further including:

a pair of rear rollers rotatably mounted on said platform to underlie and engage the rear wheels of the automobile and to be rotated thereby; and coupling means connecting said rear and front rollers to transfer driving rotation of said rear rollers to said front rollers.

4. An apparatus as defined in claim 1, further including:

a single pair of rear rollers, each of said rear rollers underlying and in contact with one of the rear wheels of the automobile, thereby to support in part the weight of the automobile;

rear axle means connected with said platform and supporting said rear rollers on an axis generally parallel with the axis of rotation of said front rollers;

a rear engagement member fixedly secured to the automobile adjacent its rearward end;

at least one link pivotally connected to said platform near the rear end thereof and movable between an initial position inclined upwardly and rearwardly from said platform and a final position inclined upwardly and forwardly from said platform;

at least one rear supporting surface carried by said link and engageable with said rear engagement member during forward movement of the automobile, said link acting to support a predetermined proportion of the automobile weight normally carried by the rear wheels, and to inhibit rearward movement of the automobile from its installed position.

5. An apparatus as defined in claim 4, further including adjustable rear stop means for preventing further forward movement of said link beyond said final position.

6. An apparatus as defined in claim 4, further including rear releasable connector means for tethering the automobile near its rear end.

7. Driven instruction apparatus for supporting a stationary automobile with a pair of steerable front wheels and a pair of rear wheels, said apparatus comprising:

a platform adapted to rest on the ground and having front and rear ends and ramp means for raising the automobile onto said platform in general alignment and overlying relation therewith;

a single pair of front rollers, each of said front rollers adapted to underlie and engage one of the front wheels of the automobile, thereby to support in part the weight of the automobile;

means connected with said platform for supporting said front rollers for rotation about an axis generally parallel with the axes of rotation of the automobile wheels;

power means independent of the automobile, connected with said front rollers for rotating the same;

an engagement member fixedly secured to the automobile at the front end thereof;

locating means connected with said platform and releasably engageable with said engagement means, said locating means including a supporting surface rigidly mounted on the front end of said platform to underlie and support said engagement member in an installed position of the automobile, and thereby to support a predetermined proportion of the weight of the automobile normally supported by the front wheels;

a guide surface extending rearwardly and downwardly from said supporting surface, said guide surface cooperating with said engagement member and guiding it onto said supporting surface during forward movement of the automobile to said installed position, and stop means connected with said supporting surface for terminating forward movement of said engagement member as said installed position is reached; and releasable connector means for connecting said locating means with said engagement member to prevent movement of the automobile from said installed position on said platform;

whereby the front wheels of the automobile in said installed position are steerable from side to side, and a simulation of real driving conditions is obtained as the front wheels, carrying only a preselected proportion of their normal load, frictionally engage said driven front rollers to an extent dependent on the steering position of the wheels.

* * * * *